(12) United States Patent
Kawai et al.

(10) Patent No.: US 6,725,716 B1
(45) Date of Patent: Apr. 27, 2004

(54) THERMO-SENSITIVE FLOW RATE SENSOR AND METHOD OF MANUFACTURING THE SAME

(75) Inventors: Masahiro Kawai, Tokyo (JP); Tomoya Yamakawa, Tokyo (JP); Akira Yamashita, Tokyo (JP); Yuuichi Sakai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 82 days.

(21) Appl. No.: 09/414,885

(22) Filed: Oct. 8, 1999

(30) Foreign Application Priority Data

Apr. 13, 1999 (JP) ............................................. 11-104938

(51) Int. Cl.⁷ ................................................. G01F 1/68
(52) U.S. Cl. ................................................. 73/204.26
(58) Field of Search .................. 73/204.26, 204.22, 73/204.25

(56) References Cited

U.S. PATENT DOCUMENTS

| 4,561,303 A | * | 12/1985 | McCarthy ................. 73/204.26 |
| 5,936,157 A | * | 8/1999 | Yamashita et al. ....... 73/204.26 |
| 6,032,527 A | * | 3/2000 | Genova et al. .......... 73/204.26 |
| 6,234,016 B1 | * | 5/2001 | Bonne et al. ............ 73/204.26 |
| 6,357,294 B1 | * | 3/2002 | Nakada .................... 73/204.26 |

FOREIGN PATENT DOCUMENTS

| JP | 60-142268 |  | 7/1985 | ............. G01P/5/10 |
| JP | 05-231895 | A | 9/1993 |  |
| JP | 06249693 | A | 9/1994 | ............. G01F/1/68 |
| JP | 08-122163 | A | 5/1996 |  |

* cited by examiner

Primary Examiner—Edward Lefkowitz
Assistant Examiner—Charlene Dickens
(74) Attorney, Agent, or Firm—Sughrue Mion, PLLC

(57) ABSTRACT

A thermo-sensitive flow rate sensor having a flow rate detecting device comprising: a plate-like substrate; a heating element and a temperature compensating element constituted by thermo-sensitive resistance films and formed on a top surface of the substrate in such a way as to be spaced apart from each other; and a low heat capacity portion formed by removing partially an area, in which the heating element is formed, of the substrate from a back surface side thereof. This thermo-sensitive flow rate sensor is used for measuring the flow velocity or flow rate of a measurement fluid according to a heat transfer phenomenon where a heat is transferred from the heating element or from a portion heated by the heating element to the measurement fluid. In this thermo-sensitive flow rate sensor, a diaphragm is constructed by forming at least one cavity by removing partially a region other than the area, in which the heating element and the temperature compensating element are formed, of the substrate from the back surface side thereof.

7 Claims, 16 Drawing Sheets

THERMO-SENSITIVE FLOW RATE SENSOR AND METHOD OF MANUFACTURING THE SAME

BACKGROUND OF THE INVENTION

1. Field of the Invention

The present invention generally relates to a flow rate sensor for measuring an intake airflow amount in, for example, an internal combustion engine, and to a method of manufacturing a flow rate detecting device used therein. More particularly, the present invention relates to a flow rate sensor, which has a heating element and which is used for measuring the flow velocity or flow rate of a fluid according to a heat transfer phenomenon where a heat is transferred to the fluid from the heating element or from a part heated by the heating element, and to a method of manufacturing a flow rate detecting device used therein.

2. Description of the Related Art

FIGS. 16 and 17 are a side sectional diagram and a plan diagram illustrating a conventional flow rate detecting device disclosed in, for instance, Japanese Patent Publication No. 5-7659 Official Gazette, respectively.

In the device shown in FIGS. 16 and 17, an insulative supporting film 2 made of silicon nitride is formed on a top surface of a plate-like substrate 1 constituted by a silicon semiconductor. A heating element 4 made of permalloy acting as a thermo-sensitive resistance material is formed on the supporting film 2. Moreover, temperature-detecting elements 5 and 6 made of permalloy acting as a thermo-sensitive resistance material are formed on the supporting film 2 in such a manner as to face each other across the heating element 4. Furthermore, an insulative protective coat 3 made of silicon nitride is formed on the supporting film 2 in such a way as to cover the heating element 4 and the temperature-detecting elements 5 and 6.

Further, opening portions 8 are formed by removing part of each of the supporting film 2 and the protective coat 3 in the vicinity of portions where the heating element 4 and the temperature-detecting elements 5 and 6 are formed. An air space 9 is formed by removing a part of the plate-like substrate 1 through the opening portions 8 by using an etching solution that does not damage silicon nitride. Thus, a bridge 13 is formed. The temperature-detecting elements 5 and 6 are arranged in a line in the direction of flow of a measurement fluid in a plane in such a manner as to face each other across the heating element 4.

Furthermore, a reference element 7 made of permalloy acting as a thermo-sensitive resistance material is provided apart and upstream from the heating element 4 in the direction of the flow 10 of the measurement fluid.

In such a conventional flow rate detecting device, a heating electric current to be supplied to the heating element 4 is controlled by a control circuit (not shown), in a manner such that the temperature of the heating element 4 is maintained at a constant temperature which is 200° C. higher than the temperature of the plate-like substrate 1 detected by using the reference element 7.

Heat generated in the heating element 4 is transmitted to the temperature detecting elements 5 and 6 through the supporting film 2, the protective coat 3 or a thermo-sensitive resistance film. The temperature detecting elements 5 and 6 are placed symmetrically with respect to the heating element 4, as shown in FIG. 17. Thus, when there is no air flow, no resistance difference occurs between the temperature detecting elements 5 and 6. Conversely, when an air flow occurs, the upstream temperature detecting element is cooled by air, while the downstream temperature detecting device is cooled less than the upstream temperature detecting device owing to heat transmitted from the heating element 4 to the air. For instance, when an air flow moving in the direction indicated by an arrow 10, the temperature of the upstream temperature detecting element 5 is lower than that of the downstream temperature detecting element 6. The higher the flow velocity or rate of air, the difference in value of resistance between both the temperature detecting elements 5 and 6 is increased. Thus, the flow velocity or rate of air can be measured by detecting the difference in value of resistance between both the temperature detecting elements 5 and 6.

Further, when the direction of airflow is opposite to that indicated by the arrow 10, the temperature of the upstream temperature detecting element 6 is lower than that of the downstream temperature detecting element 5. Thus, it is also possible to detect the direction of airflow.

Although FIGS. 16 and 17 illustrate a conventional thermo-sensitive flow rate detecting device of the bridge type, hitherto, similarly, a thermosensitive flow rate detecting device of the diaphragm type has been widely used.

FIGS. 18 and 19 are a sectional diagram and a plan diagram illustrating a conventional thermo-sensitive flow rate detecting device of the diaphragm type, respectively.

In the device shown in FIGS. 18 and 19, each of composing elements designated by reference numerals 1 to 10 is substantially the same as the composing element, which is denoted by the same reference numeral, of the flow rate detecting device illustrated in FIGS. 16 and 17 In the conventional flow rate detecting device shown in FIGS. 18 and 19, a recess portion 12 is formed by removing part of the plate-like substrate 1 from a back surface (opposite to the top surface on which the supporting film 2 is formed) of this substrate 1 by, for example, etching. Thus, the supporting film 2 and the protective coat 3 compose a diaphragm 14 by sandwiching the heating element 4 and the temperature detecting elements 5 and 6. With such a configuration, high strength can be obtained, in comparison with the flow rate detecting device of the bridge type shown in FIGS. 16 and 17. Therefore, this conventional flow rate detecting device of the diaphragm type is suitable for use in harsh environments, for instance, an intake air flow rate sensor of an automotive engine. Incidentally, this conventional flow rate detecting device employs the principle of detecting the flow velocity or rate of air, which is similar to the principle employed in the above-mentioned conventional flow rate detecting device of the bridge type.

Meanwhile, in such a flow rate sensor having a diaphragm structure, the diaphragm 14 is in contact with the plate-like substrate 1 along the entire circumference thereof. Thus, a large part of heat generated by the heating element 4 is transmitted to the plate-like substrate 1 through the diaphragm 14. Therefore, such a flow rate sensor has a drawback in that the flow-rate detecting sensitivity thereof is lowered and that the responsivity thereof is degraded. The lowering of the sensitivity and responsivity can be prevented to some degree by increasing the size of and decreasing the thickness of the diaphragm as much as possible, whereas the flow rate sensor has another drawback in that the strength of the diaphragm 14 becomes very low. Additionally, when the amount of the heat transmitted to the plate-like substrate 1 is increased, such heat is also transmitted to the reference element 7. This results in rise of the temperature of the reference element 7. Consequently, the measurement of a fluid cannot be accurately achieved. This may adversely affect the flow-rate detecting accuracy of the sensor.

SUMMARY OF THE INVENTION

The present invention is accomplished to eliminate the above-mentioned drawbacks of the conventional flow rate sensor.

Accordingly, an object of the present invention is to provide a thermo-sensitive flow rate sensor with high detecting-sensitivity, responsivity and reliability, and which has a temperature compensating element with high measuring-fluid temperature detecting accuracy, by constructing a diaphragm by forming a cavity in a plate-like substrate by removing partially a region other than areas, in which a heating element and the temperature compensating element are formed, of the substrate, thereby increasing the heat resistance of the substrate and decreasing the heat capacity thereof.

Further, another object of the present invention is to provide a method of manufacturing such a thermo-sensitive flow rate sensor in a simple manufacturing process.

To achieve the foregoing object, according to an aspect of the present invention, there is provided a thermo-sensitive flow rate sensor having a flow rate detecting device comprising: a plate-like substrate; a heating element and a temperature compensating element constituted by thermo-sensitive resistance films and formed on a top surface of the substrate in such a way as to be spaced apart from each other; and a low heat capacity portion formed by removing partially an area, in which the heating element is formed, of the substrate from a back surface side thereof. This thermo-sensitive flow rate sensor is used for measuring the flow velocity or flow rate of a measurement fluid according to a heat transfer phenomenon where a heat is transferred from the heating element or from a portion heated by the heating element to the measurement fluid. In this thermo-sensitive flow rate sensor, a diaphragm is constructed by forming at least one cavity by removing partially a region other than the area, in which the heating element and the temperature compensating element are formed, of the substrate from the back surface side thereof.

According to another aspect of the present invention, there is provided a method of manufacturing a thermo-sensitive flow rate sensor having a flow rate detecting device comprising: a plate-like substrate; a heating element and a temperature compensating element constituted by thermo-sensitive resistance films and formed on a top surface of the substrate in such a way as to be spaced apart from each other; and a low heat capacity portion formed by removing partially an area, in which the heating element is formed, of the substrate from a back surface side thereof. This thermosensitive flow rate sensor is used for measuring the flow velocity or flow rate of a measurement fluid according to a heat transfer phenomenon where a heat is transferred from the heating element or from a portion heated by the heating element to the measurement fluid. This method has a step of constructing a diaphragm by forming at least one cavity by removing partially a region other than the area, in which the heating element and the temperature compensating element are formed, of the substrate from the back surface side thereof. In this step, a silicon substrate having a crystal orientation of (110) is provided with the plate-like substrate. An anisotropic wet etching is performed on the silicon substrate to form the at least one cavity.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

First Embodiment

Figure 1:
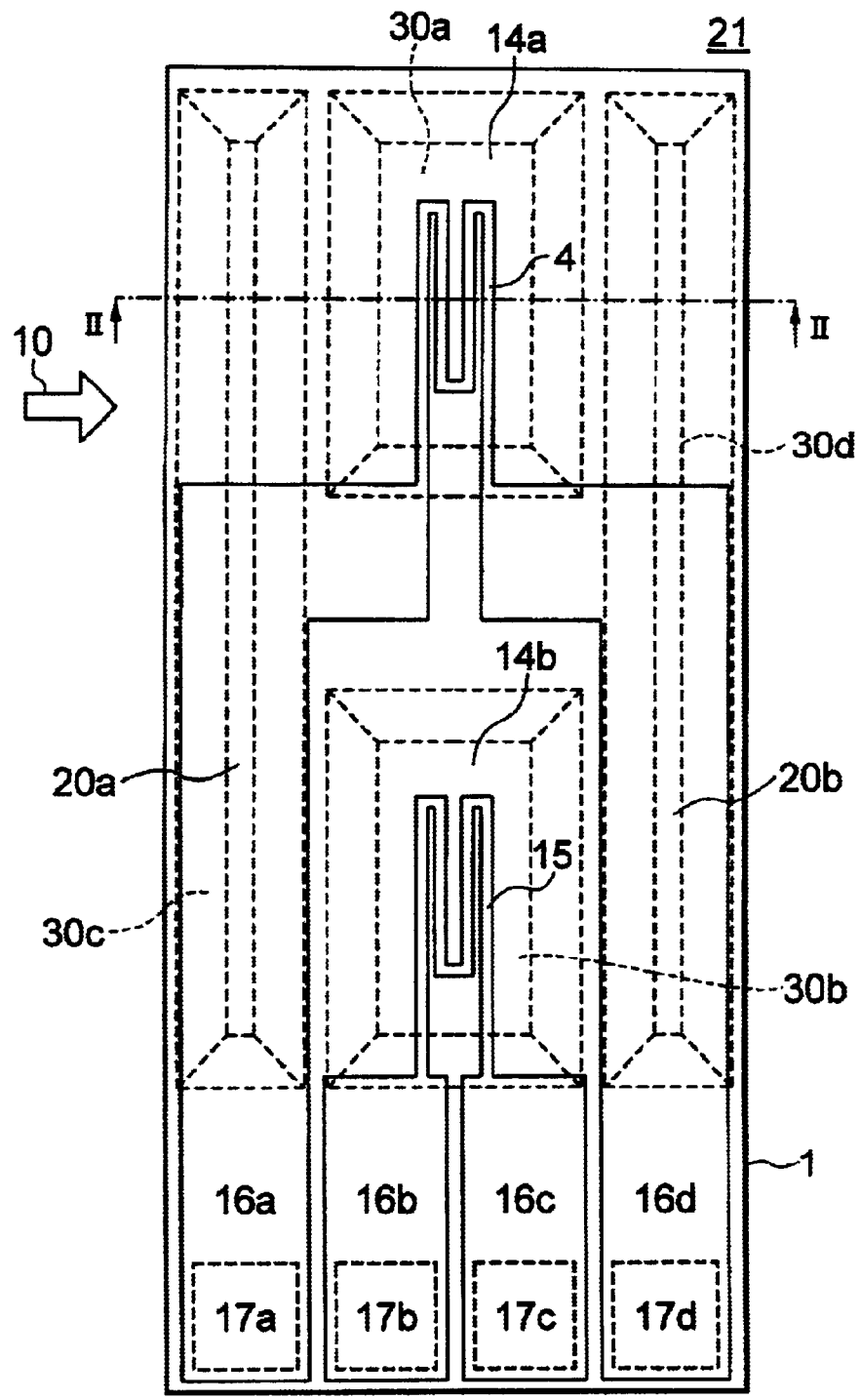
FIG. 1 is a plan view of a flow rate detecting device used in a flow rate sensor according to a first embodiment of the present invention.
Figure 2:
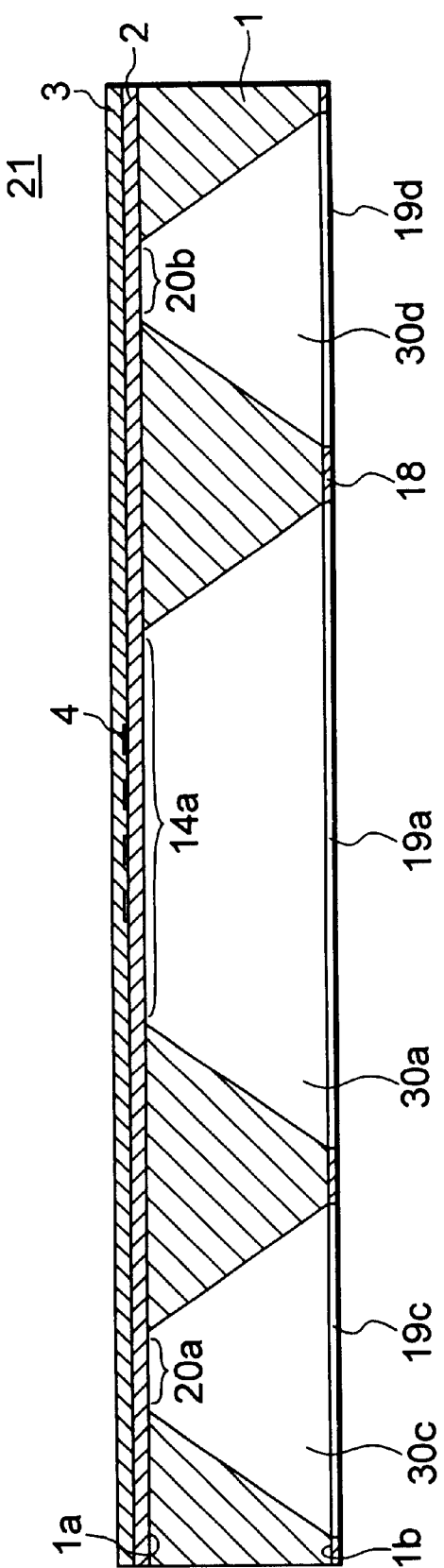
FIG. 2 is a sectional view taken in the direction of arrows on line II—II of FIG. 1.

FIG. 1 is a plan view of a flow rate detecting device used in a flow rate sensor according to the first embodiment of the present invention. FIG. 2 is a sectional view taken in the direction of arrows on line II—II of FIG. 1.

In the device shown in FIGS. 1 and 2, a plate-like substrate 1 is constituted by a silicon substrate about 0.4 mm thick having a crystal orientation of (100). Further, a 1-μm-thick insulative supporting film 2 made of silicon nitride is formed on a top surface 1a of the plate-like substrate 1 by performing a method, such as sputtering, vapor deposition or CVD.

Moreover, a heating element 4 constituted by a thermo-sensitive resistance film, such as a platinum film, is formed on the supporting film 2. This heating element 4 is configured in the following process in such a manner as to form a current path. First, a 0.2-μm-thick thermo-sensitive platinum film is formed on the supporting film 2 by using a vapor deposition or sputtering method. Then, patterning is performed on this thermo-sensitive resistance film by employing a photolithographic method and a wet (or dry) etching method. In this embodiment, the size of this heating element is, for instance, 1 mm×0.3 mm.

Furthermore, a temperature compensating element 15 constituted by a thermo-sensitive resistance film, such a platinum film, is formed on the supporting film 2 apart from the heating element 4. This temperature compensating element 15 is constructed in a process similar to the process of forming the heating element 4. First, a 0.2-μm-thick thermo-sensitive resistance film, such a platinum film, is formed on the surface of the supporting film 2 by using a vapor deposition or sputtering method. Subsequently, patterning is performed on this thermo-sensitive resistance film by performing a photolithographic method and a wet (or dry) etching method. Thus, this temperature compensating element 15 is formed in such a way as to form a current path. In this case, the size of this temperature compensating element is, for instance, 1 mm×0.3 mm. Incidentally, the heating element 4 and the temperature compensating element 15 may be formed in the same step if these elements are formed from the same material in such a way as to have a film thickness.

Moreover, an insulative protective coat 3 constituted by a 1-μm-thick film made of silicon nitride is formed on the heating element 4 and the temperature compensating element 15 by performing the sputtering, vapor deposition or CVD method. The heating element 4 and the temperature compensating element 15 are connected through lead patterns 16a to 16d to electrodes 17a to 17d for electrically connecting the flow rate detecting device 21 to an external circuit. These lead patterns 16a to 16d are simultaneously formed when the patterning is performed on the heating element 4 and the temperature compensating element 15. Further, the protective coats 3 formed on the electrodes 17a to 17d are removed so as to connect bonding wires to the electrodes 17a to 17d. Incidentally, FIG. 1 illustrates the device by removing the entire protective coat 3 so as to clearly show the patterns formed on the supporting film 2 (additionally, FIGS. 6, 7, 8, 9, 11 and 13 illustrate the devices in a similar manner).

Further, cavities 30a, 30b, 30c and 30d are provided in a back surface 1b (opposite to the top surface 1a) of the plate-like substrate 1 in such a way as to separate from one another. Thus, diaphragms 14a, 14b, 20a and 20b are formed. The heating element 4 is placed in the diaphragm 14a acting as a low heat capacity portion. The temperature compensating element 15 is placed in the diaphragm 14b acting as a low heat capacity portion. Further, the diaphragms 20a and 20b are provided at portions other than the areas in which the heating element 4 and the temperature element 15 are formed.

These diaphragms 14a, 14b, 20a and 20b are formed as follows. First, a back-surface protecting film 18 is formed on the back surface 1b of the plate-like substrate 1. Subsequently, etching holes 19a, 19b, 19c and 19d are formed by eliminating the back-surface protecting film 18 by, for instance, a photolithographic method. Thereafter, cavities 30a, 30b, 30c and 30d are formed by removing exposed portions of the plate-like substrate 1, which have trapezoidal sections and extend from the back surface 1b to the supporting film 2, by, for example, alkali etching. Incidentally, the size of each of the diaphragms 14a and 14b is, for instance, 1.5 mm×0.9 mm. Further, the size of each of the diaphragms 20a and 20b is, for instance, 5 mm×0.2 mm. Additionally, the etching hole 19b (not shown in FIG. 2) is used for forming the diaphragm 4b.

Next, the flow rate sensor using the flow rate detecting device of such a configuration will be described hereunder.

Figure 3:
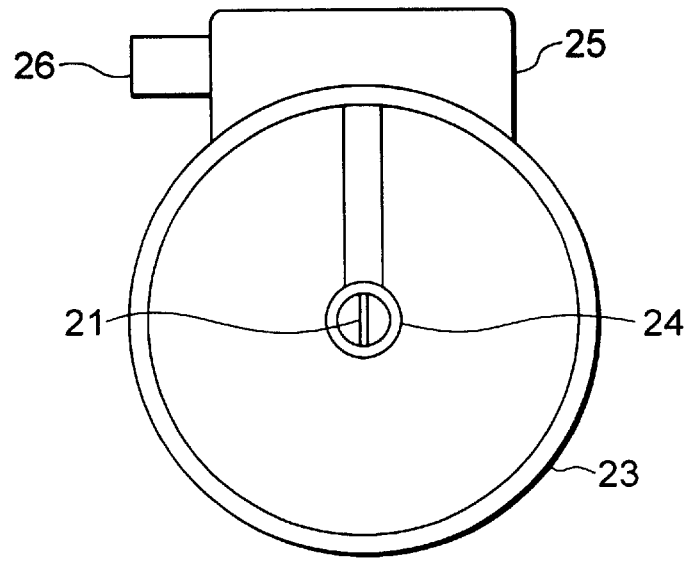
FIG. 3 is a front view of the flow rate sensor according to the first embodiment of the present invention.
Figure 4:
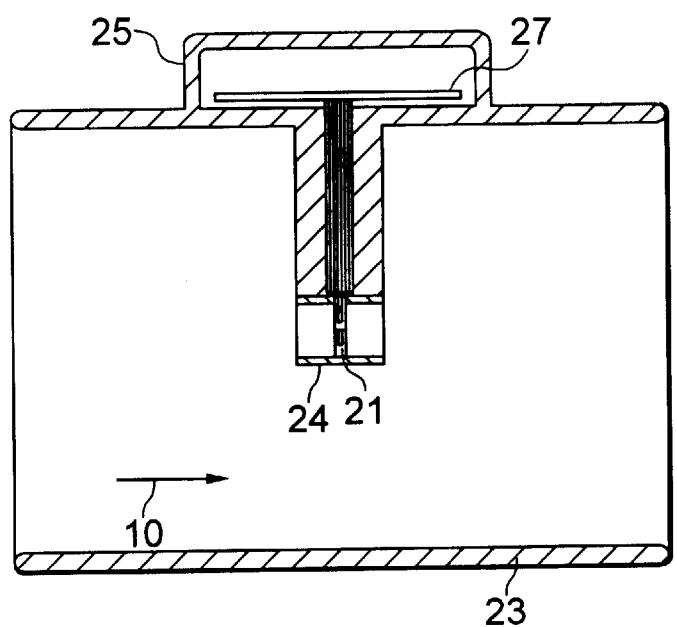
FIG. 4 is a sectional view of the flow rate sensor according to the first embodiment of the present invention.

FIG. 3 is a front view of the flow rate sensor according to the first embodiment of the present invention. FIG. 4 is a transversal sectional view of the flow rate sensor according to the first embodiment of the present invention.

As shown in FIGS. 3 and 4, this flow sensor comprises a cylindrical main passage pipe 23 serving as a passage for a measurement fluid to be measured, and a cylindrical detecting pipe 24 coaxially disposed in this main passage pipe 23. The flow rate detecting device 21 shown in FIGS. 1 and 2 is fixed in the detecting pipe 24 so that the top surface 1a thereof is nearly parallel to the direction 10 of flow of the measurement fluid.

A case 25 is provided on a peripheral portion of the main passage pipe 23. A circuit board 27 including a control circuit for controlling the flow rate detecting device 21 is accommodated in this case 25. Moreover, a connector 26 for connecting the control circuit to power supply and for taking an output signal to an external circuit is attached to the outer surface of the case 25.

Incidentally, the configuration of the flow rate sensor illustrated in FIGS. 3 and 4 is the same as those of flow rate sensors of other embodiments that will be described hereinbelow.

The flow rate of a measurement fluid can be stably measured by incorporating the flow rate detecting device 21 into such a flow rate sensor.

Figure 5:
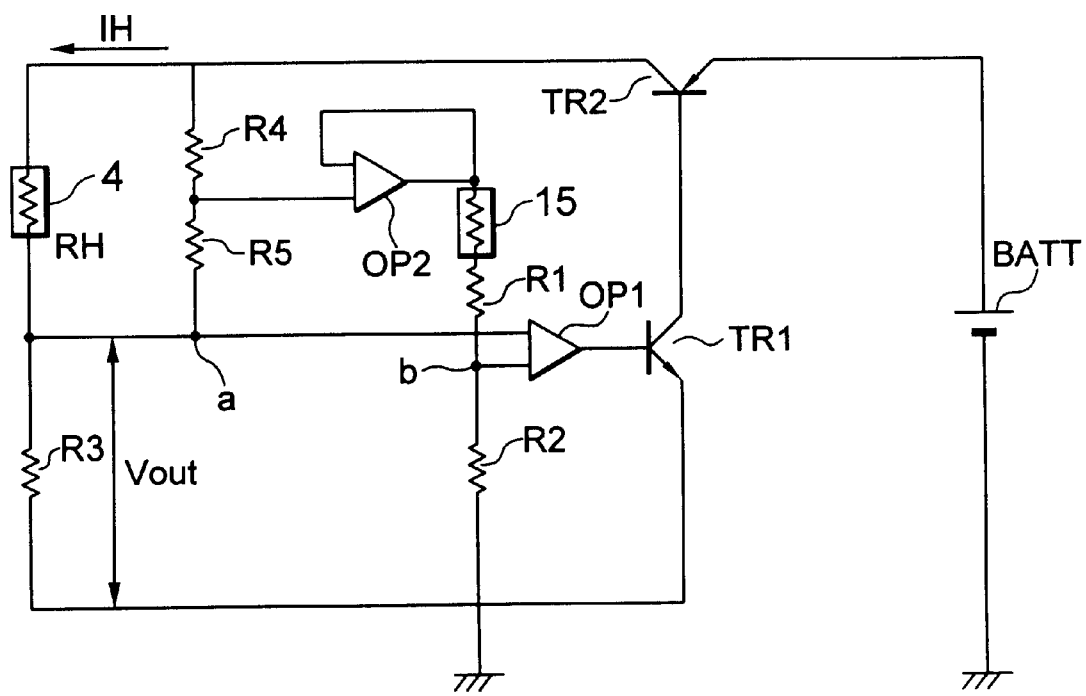
FIG. 5 is a circuit diagram of a control circuit of the flow rate sensor according to the first embodiment of the present invention.

In this flow rate sensor, the heating element 4 is controlled by the control circuit shown in FIG. 5 in such a manner as to have a resistance value by which the average temperature of the heating element 4 has a predetermined value. This control circuit is constituted by a bridge circuit including the temperature compensating element 15 and the heating element 4. In this figure, reference characters R1, R2, R3, R4 and R5 designate fixed resistors. Reference characters OP1 and OP2 denote operational amplifiers. Reference characters TR1 and TR2 designate transistors, and BATT denotes a power supply. Further, the composing elements of the control circuit except the temperature compensating element 15 and the heating element 4 are configured on the circuit board 27.

This control circuit acts so that the electric potential at nodes a and b shown in FIG. 5 are nearly equal to each other. Moreover, this control circuit controls a heating current IH for the heating element 4. When the flow velocity of the fluid to be measured increases, an amount of heat transferred to this fluid from the heating element 4 increases. Thus, when the average temperature of the heating element 4 is maintained at a predetermined value, the heating current IH increases. When this heating current is detected in terms of a voltage Vout developed across the resistor R3, the flow velocity or flow rate of a fluid flowing through the passage having a predetermined sectional area can be detected.

Let RH, TH, TA and Q denote the resistance value of the heating element 4, the average temperature thereof, the temperature of a fluid to be measured, and the flow rate of the fluid flowing through the passage having a predetermined sectional area, respectively. Thus, the following equation (1) holds.

$$IH^2 \times RH = (x + y \times Q^n) \times (TH - Ta) \tag{1}$$

where x, y and n are constants determined by the form of the flow rate detecting device. Namely, the constant "x" is a coefficient corresponding to a quantity of heat that does not depend on the flow rate. The major portion of this coefficient is the heat conduction loss of heat transmitted from the heating element 4 to the plate-like substrate 1. Further, the constant "y" is a coefficient corresponding to forced-convection heat transfer. Furthermore, the constant "n" is determined by the condition of flow of a fluid in the proximity of the heating element 4 and is 0.5 or so.

As is apparent from the equation (1), the quantity of heat corresponding to the coefficient "x" does not contribute to a detected flow rate. Therefore, reduction in capacity of the plate-like substrate 1, which is caused by providing other diaphragms 20a and 20b in the device, results in increase in heat resistance of the plate-like substrate 1. Consequently, the heat conduction loss of heat transferred from the heating element 4 to the plate-like substrate 1 is reduced. Thus, the sensitivity of the flow rate sensor is enhanced.

Moreover, the heat capacity of the plate-like substrate 1 is decreased. Thus, a time taken to change heat flowing through the plate-like substrate 1 is reduced. Furthermore, the time between a moment, at which the flow rate sensor is activated by supplying electric power thereto, and another moment, at which the sensor outputs an accurate flow rate signal, is reduced.

Second Embodiment

Figure 6:
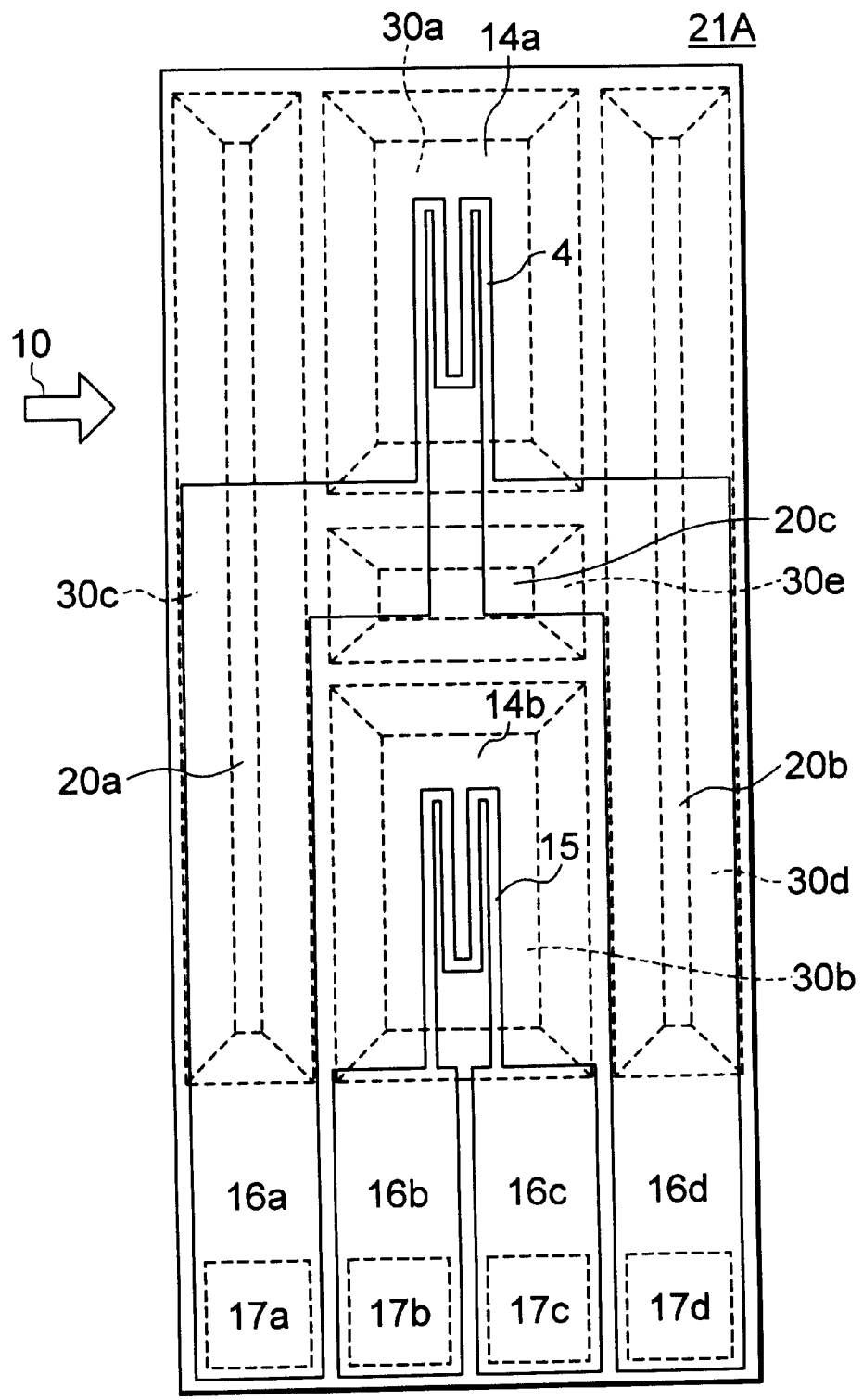
FIG. 6 is a plan view of a flow rate detecting device used in a flow rate sensor according to a second embodiment of the present invention.

FIG. 6 is a plan view of a flow rate detecting device used in a flow rate sensor according to the second embodiment of the present invention.

In this second embodiment, a diaphragm 20c is obtained by forming a cavity 30e as a result of removing a part, which has a trapezoidal section and extends from the back surface 1b to a supporting film 2, of a plate-like substrate 1 in a region between the heating element 4 and the temperature compensating element 15. Incidentally, the other composing elements are similar to those of the first embodiment.

In such a flow rate detecting device 21A, a diaphragm 20c is provided in addition to diaphragms 20a and 20b. Thus, the volume of the plate-like substrate 1 is reduced still more. Further, the heat resistance of the plate-like substrate 1 is increased. Consequently, the heat conduction loss of heat transmitted from the heating element 4 to the plate-like substrate 1 is decreased still more, so that the sensitivity of this flow rate sensor is improved.

Furthermore, the heat capacity of the plate-like substrate 1 is reduced still more. Thus, a time taken to change heat flowing through the plate-like substrate 1 is decreased. Further, the time between a moment, at which the flow rate sensor is activated by supplying electric power thereto, and another moment, at which the sensor outputs an accurate flow rate signal, is shortened.

Moreover, the heat conduction path between the heating element 4 and the temperature compensating element 15 is narrowed by the diaphragm 20c. Thus, even when the heat insulation between the heating element 4 and the plate-like substrate 1 is insufficient and the temperature of the plate-like substrate 1 rises owing to heat conduction, the rise of temperature at a portion, in which the temperature compensating element 15 is placed, is reduced. Consequently, the temperature of a fluid is accurately measured. Further, the flow rate detecting accuracy is enhanced.

Third Embodiment

Figure 7:
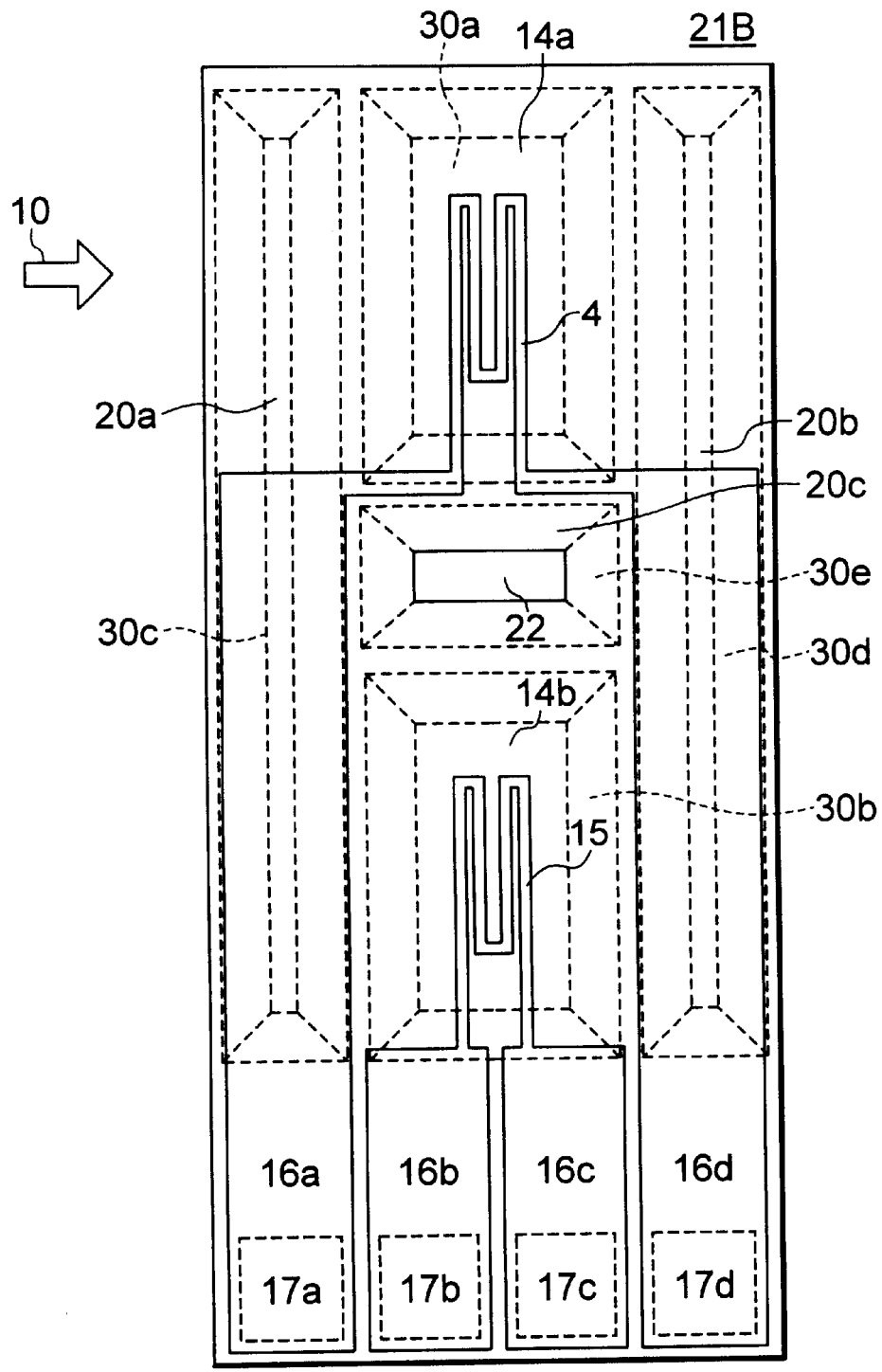
FIG. 7 is a plan view of a flow rate detecting device used in a flow rate sensor according to a third embodiment of the present invention.

FIG. 7 is a plan view of a flow rate detecting device used in a flow rate sensor according to the third embodiment of the present invention.

In this third embodiment, a diaphragm 20c is provided in a region between the heating element 4 and the temperature compensating element 15, as illustrated in FIG. 7. Moreover, a hole 22 is formed in the diaphragm 20c. Incidentally, the remaining composing elements of the third embodiment is similar to the corresponding composing elements of the first embodiment.

In such a flow rate detecting device 21B, a diaphragm 20c is provided in addition to diaphragms 20a and 20b. Thus, the volume of the plate-like substrate 1 is reduced still more. Further, the heat resistance of the plate-like substrate 1 is increased. Consequently, the heat conduction loss of heat transmitted from the heating element 4 to the plate-like substrate 1 is decreased still more, so that the sensitivity of this flow rate sensor is improved.

Furthermore, the heat capacity of the plate-like substrate 1 is reduced still more. Thus, a time taken to change heat flowing through the plate-like substrate 1 is decreased. Further, the time between a moment, at which the flow rate sensor is activated by supplying electric power thereto, and another moment, at which the sensor outputs an accurate flow rate signal, is shortened.

Moreover, the heat conduction path between the heating element 4 and the temperature compensating element 15 is cut off by the hole 22. Thus, even when the heat insulation between the heating element 4 and the plate-like substrate 1 is insufficient and the temperature of the plate-like substrate 1 rises owing to heat conduction, the rise of temperature at a portion, in which the temperature compensating element 15 is placed, is reduced. Consequently, the temperature of a fluid is accurately measured. Further, the flow rate detecting accuracy is enhanced.

Fourth Embodiment

Figure 8:
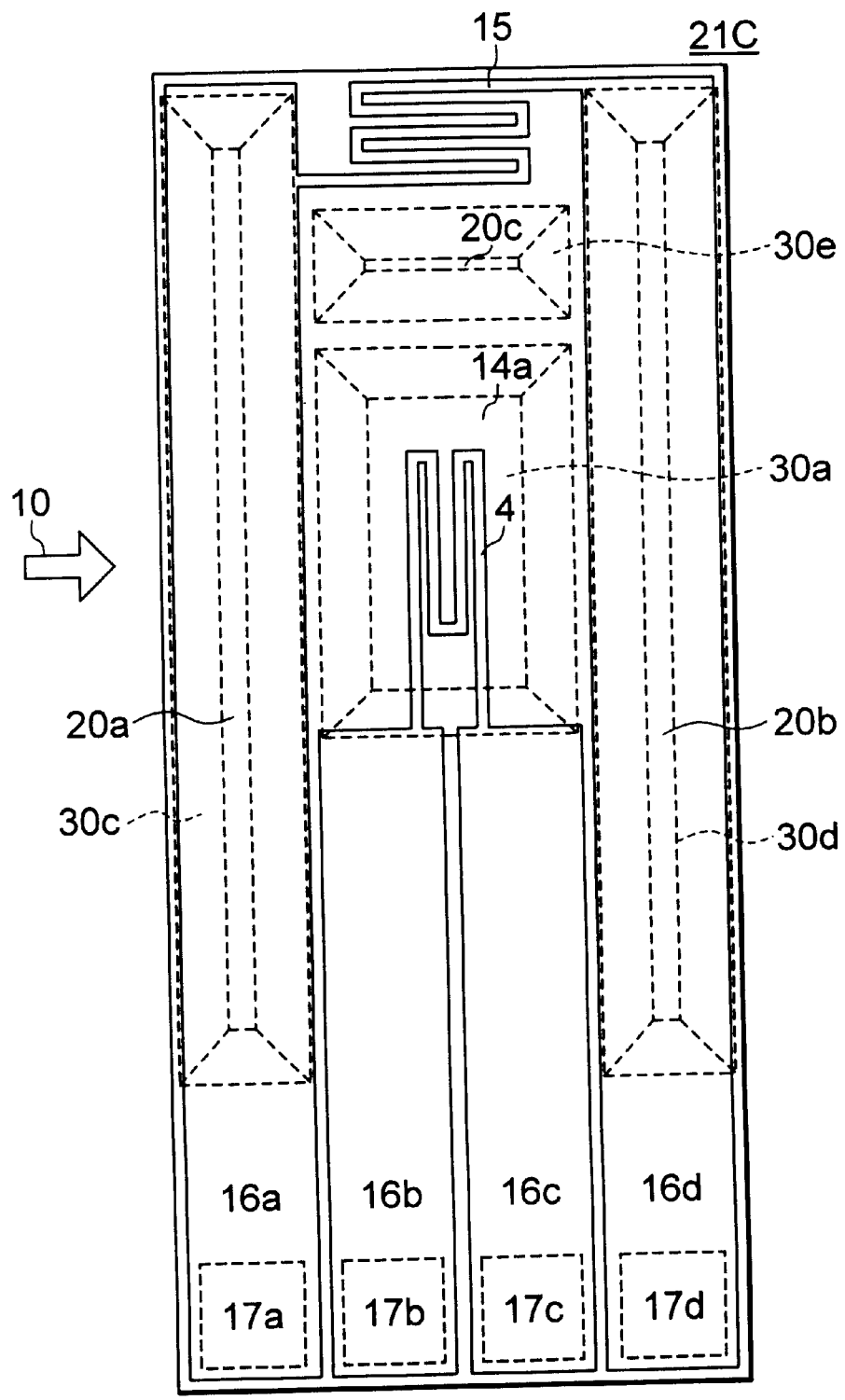
FIG. 8 is a plan view of a flow rate detecting device used in a flow rate sensor according to a fourth embodiment of the present invention.

FIG. 8 is a plan view of a flow rate detecting device used in a flow rate sensor according to the fourth embodiment of the present invention.

In this fourth embodiment, as illustrated in FIG. 8, a temperature compensating element 15 is provided at an end portion of the plate-like substrate, which is opposite to electrodes 17a to 17d. Further, a diaphragm 20c is provided in a region between the heating element 4 and the temperature compensating element 15. Moreover, in the fourth embodiment, there is no cavity corresponding to the cavity 30b formed under the temperature compensating element 15 in the first embodiment. Incidentally, the remaining composing elements of the fourth embodiment is similar to the corresponding composing elements of the first embodiment.

In such a flow rate detecting device 21C, a diaphragm 20c is provided in addition to diaphragms 20a and 20b. Thus, the volume of the plate-like substrate 1 is reduced still more. Further, the heat resistance of the plate-like substrate 1 is increased. Consequently, the heat conduction loss of heat transmitted from the heating element 4 to the plate-like substrate 1 is decreased still more, so that the sensitivity of this flow rate sensor is improved.

Furthermore, the heat capacity of the plate-like substrate 1 is reduced still more. Thus, a time taken to change heat flowing through the plate-like substrate 1 is decreased. Further, the time between a moment, at which the flow rate sensor is activated by supplying electric power thereto, and another moment, at which the sensor outputs an accurate flow rate signal, is shortened.

Moreover, the heat conduction path between the heating element 4 and the temperature compensating element 15 is narrowed by the diaphragm 20c. Thus, even when the heat, insulation between the heating element 4 and the plate-like substrate 1 is insufficient and the temperature of the plate-like substrate 1 rises owing to heat conduction, the rise of temperature at a portion, in which the temperature compensating element 15 is placed, is reduced. Consequently, the temperature of a fluid is accurately measured. Further, the flow rate detecting accuracy is enhanced.

Incidentally, the flow rate detecting device is mounted in the sensor so that an end, portion of the device, which is placed at the side of the electrodes 17a to 17d, is supported. Thus, the end portion thereof at the side of the electrodes 17a to 17d requires sufficient mechanical strength. Therefore, when the temperature compensating element 15 is provided between the heating element 4 and a set of the electrodes 17a to 17d, it is necessary for ensuring the mechanical strength of portions surrounding the electrodes 17a to 17d that the temperature compensating element 15 (or the cavity 30b) is formed in such a way as to be apart from the electrodes 17a to 17d. This results in increase in distance between the heating element 4 and each of the electrodes 17a to 17d. Thus, the size of the plate-like substrate 1 is increased. In a flow rate detecting device 21 C of this fourth embodiment, the temperature compensating element 15 is placed at an end portion of the plate-like substrate 1, which is opposite to the electrodes 17a to 17d, across the heating element 4 from these electrodes. This eliminates the above-mentioned requirement, so that the distance between the heating element 4 and each of the electrodes 17a to 17d is decreased, that the size of the plate-like substrate 1 is reduced and that thus, the volume of the plate-like substrate 1 is reduced. Further, a space illustrated on the upper side of the temperature compensating element 15 in FIG. 8 is extremely small. The size of the plate-like substrate 1 is reduced by an amount of decrease in such a space. Consequently, the heat capacity of the plate-like substrate 1 decreases. Further, the temperature followability of the temperature compensating element 15 is enhanced. Thus, the responsivity to a change in temperature of a fluid to be measured is improved.

Fifth Embodiment

Figure 9:
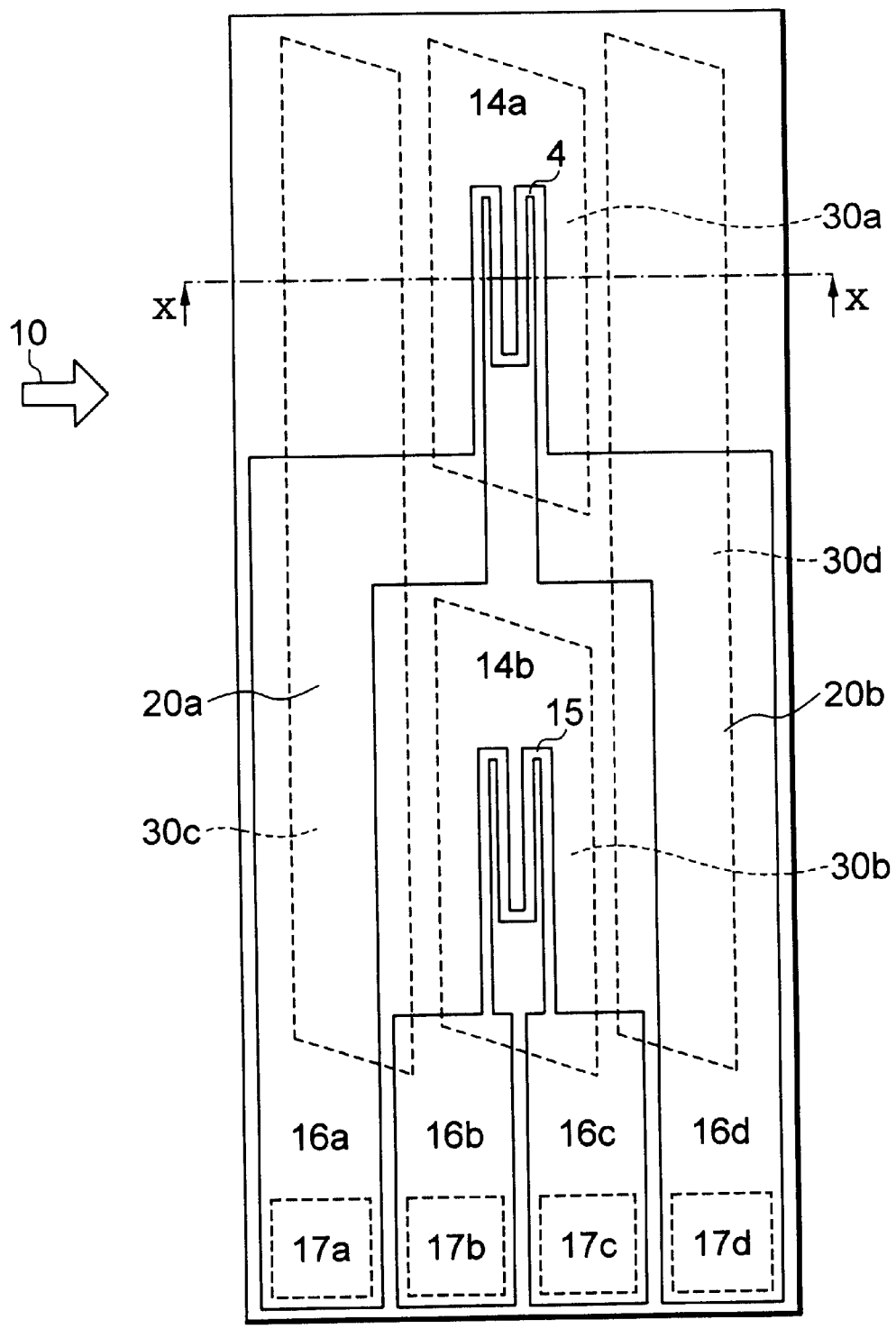
FIG. 9 is a plan view of a flow rate detecting device used in a flow rate sensor according to a fifth embodiment of the present invention.
Figure 10:
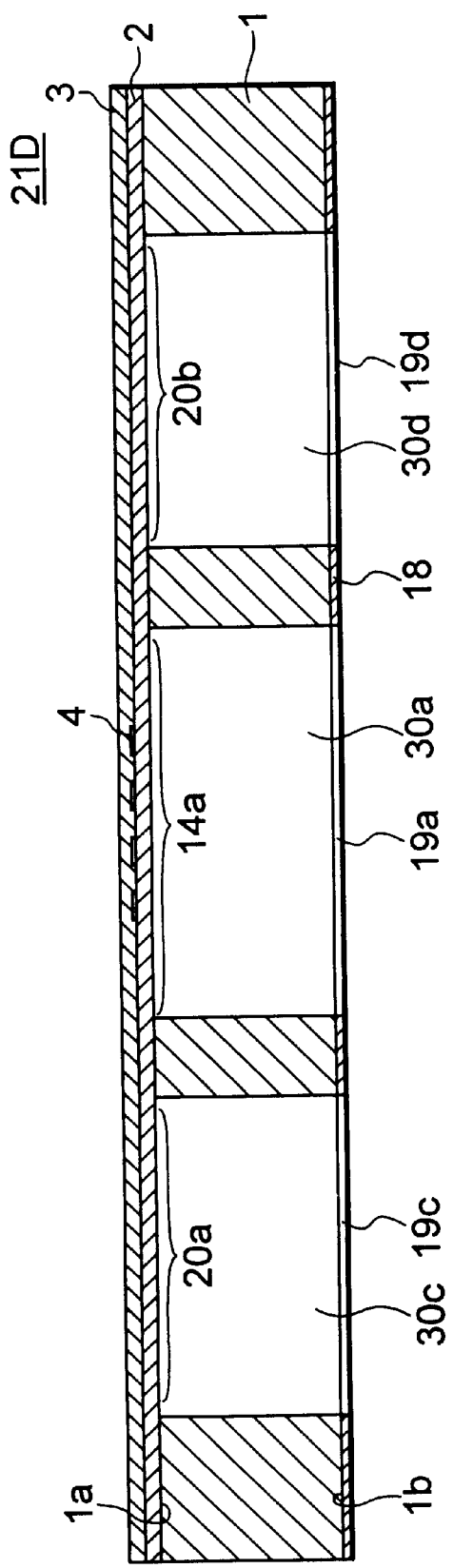
FIG. 10 is a sectional view taken in the direction of arrows on line X—X of FIG. 9.

FIG. 9 is a plan view of a flow rate detecting device used in a flow rate sensor according to the fifth embodiment of the present invention. FIG. 10 is a sectional view taken in the direction of arrows on line X—X of FIG. 9

In this fifth embodiment, cavities 30a, 30b, 30c and 30d, each of which is perpendicular to the top surface la of the plate-like substrate 1 and has a rectangular section, are formed by performing anisotropic wet etching on the plate-like substrate 1 constituted by an about 0.4-mm thick silicon substrate having a crystal orientation of (110). Thus, diaphragms 14a, 14b, 20a and 20b are formed. Furthermore, the size of the rhombic cavities 14a and 14b is, for instance, 1.5 mm×0.2 mm. Additionally, the size of the rhombic cavities 20a and 20b is, for instance, 5 mm×0.2 mm. Incidentally, the remaining composing elements of the fifth embodiment are similar to the corresponding composing elements of the above-mentioned first embodiment.

In such a flow rate detecting device 21D, each of the cavities 30a, 30b, 30c and 30d obtained by etching the plate-like substrate 1 has a rectangular section. Thus, a larger part of the plate-like substrate 1 is eliminated from a predetermined area thereof, so that the heat resistance of the substrate 1 is increased. Consequently, the heat conduction loss of heat transmitted from the heating element 4 to the plate-like substrate 1 is reduced, so that the sensitivity of the flow rate sensor is enhanced.

Moreover, the heat capacity of the plate-like substrate 1 is reduced. Thus, a time taken to change heat flowing through the plate-like substrate 1 is decreased. Further, the time between a moment, at which the flow rate sensor is activated by supplying electric power thereto, and another moment, at which the sensor outputs an accurate flow rate signal, is shortened.

Sixth Embodiment

Figure 11:
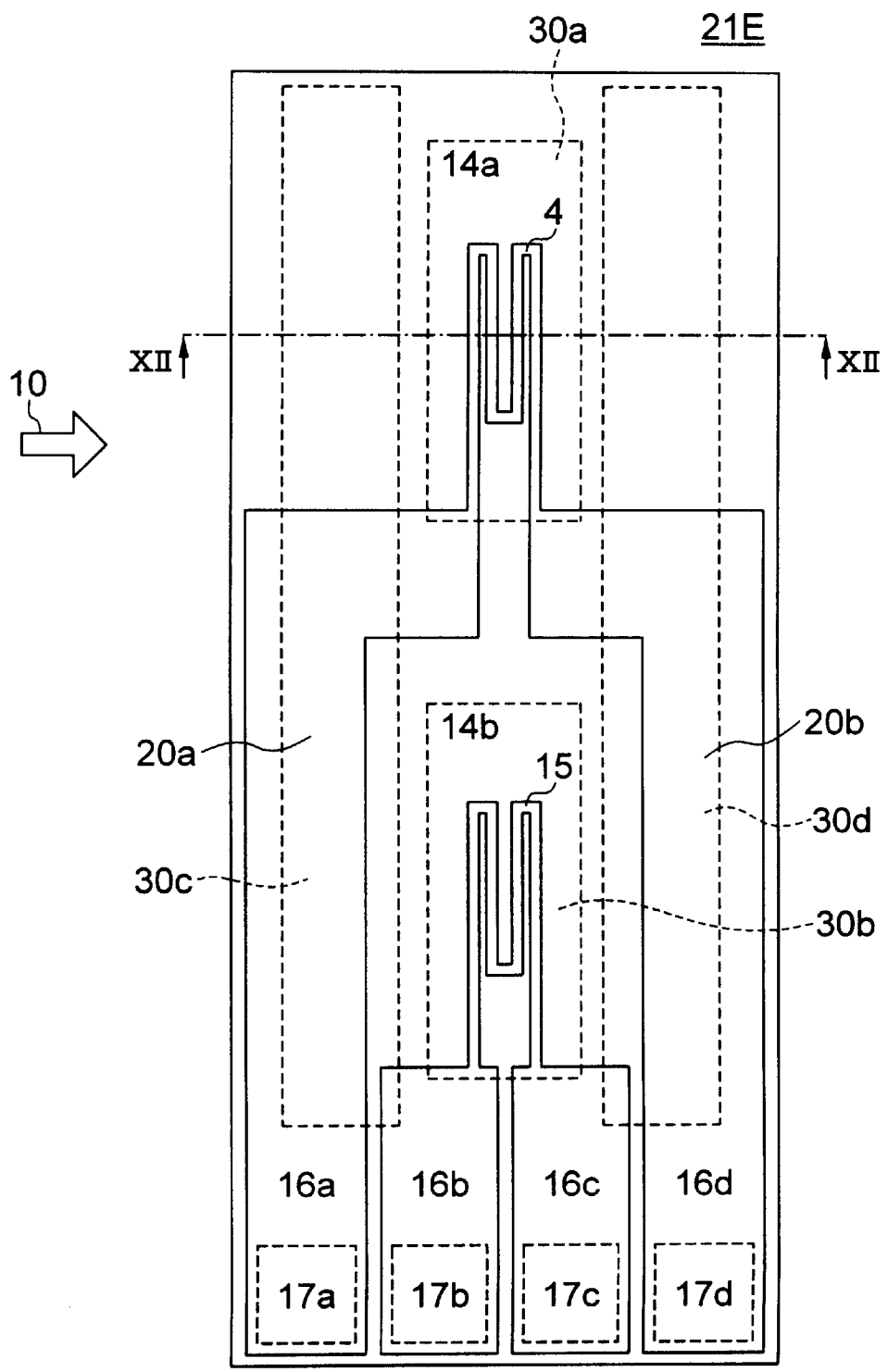
FIG. 11 is a plan view of a flow rate detecting device used in a flow rate sensor according to a sixth embodiment of the present invention.
Figure 12:
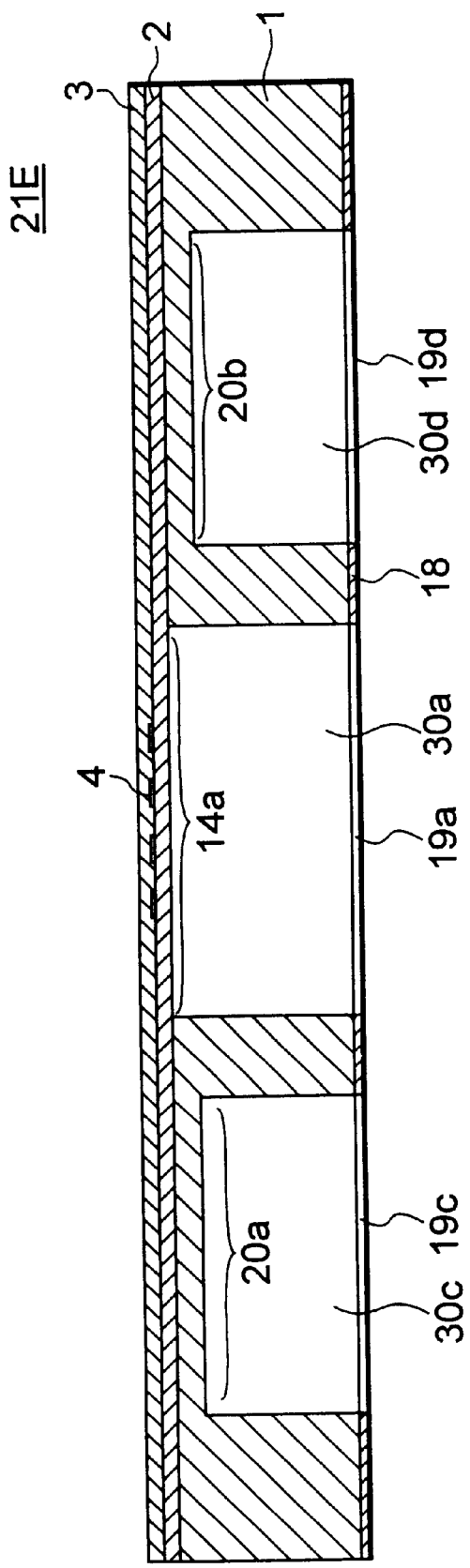
FIG. 12 is a sectional view taken in the direction of arrows on line XII—XII of FIG. 11.

FIG. 11 is a plan view of a flow rate detecting device used in a flow rate sensor according to the sixth embodiment of the present invention. FIG. 12 is a sectional view taken in the direction of arrows on line XII—XII of FIG. 11.

In this sixth embodiment, cavities 30a and 30b, each of which is perpendicular to the top surface la of the plate-like substrate 1 and has a rectangular section, are formed by performing dry etching on parts, which extend from the back surface 1b to the supporting film 2, of the plate-like substrate 1 constituted by an about 0.4-mm thick silicon substrate. Thus, diaphragms 14a and 14b are formed. Further, cavities 30c and 30d, each of which is perpendicular to the top surface la of the plate-like substrate 1 and has a rectangular section, are formed by performing dry etching on parts, which extend from the back surface 1b to a position of near to the supporting film 2, of the plate-like substrate 1 until the thickness of the plate-like substrate 1 is, for example, 10 μm. Thus, diaphragms 20a and 20b are formed. Furthermore, the size of the cavities 14a and 14b is, for instance, 1 mm×0.9 mm. Additionally, the size of the cavities 20a and 20b is, for instance, 5 mm×0.3 mm. Incidentally, the remaining composing elements of the sixth embodiment are similar to the corresponding composing elements of the above-mentioned first embodiment.

In such a flow rate detecting device 21E, the size of the diaphragms 20a and 20b is increased, without reducing the strength of the plate-like substrate 1, by thickening these diaphragms. Thus, the heat resistance of the substrate 1 is increased. Consequently, the heat conduction loss of heat transmitted from the heating element 4 to the plate-like substrate 1 is reduced, so that the sensitivity of the flow rate sensor is enhanced.

Moreover, the heat capacity of the plate-like substrate 1 is decreased. Thus, a time taken to change heat flowing through the plate-like substrate 1 is reduced. Further, the time between a moment, at which the flow rate sensor is activated by supplying electric power thereto, and another moment, at which the sensor outputs an accurate flow rate signal, is shortened.

Seventh Embodiment

Figure 13:
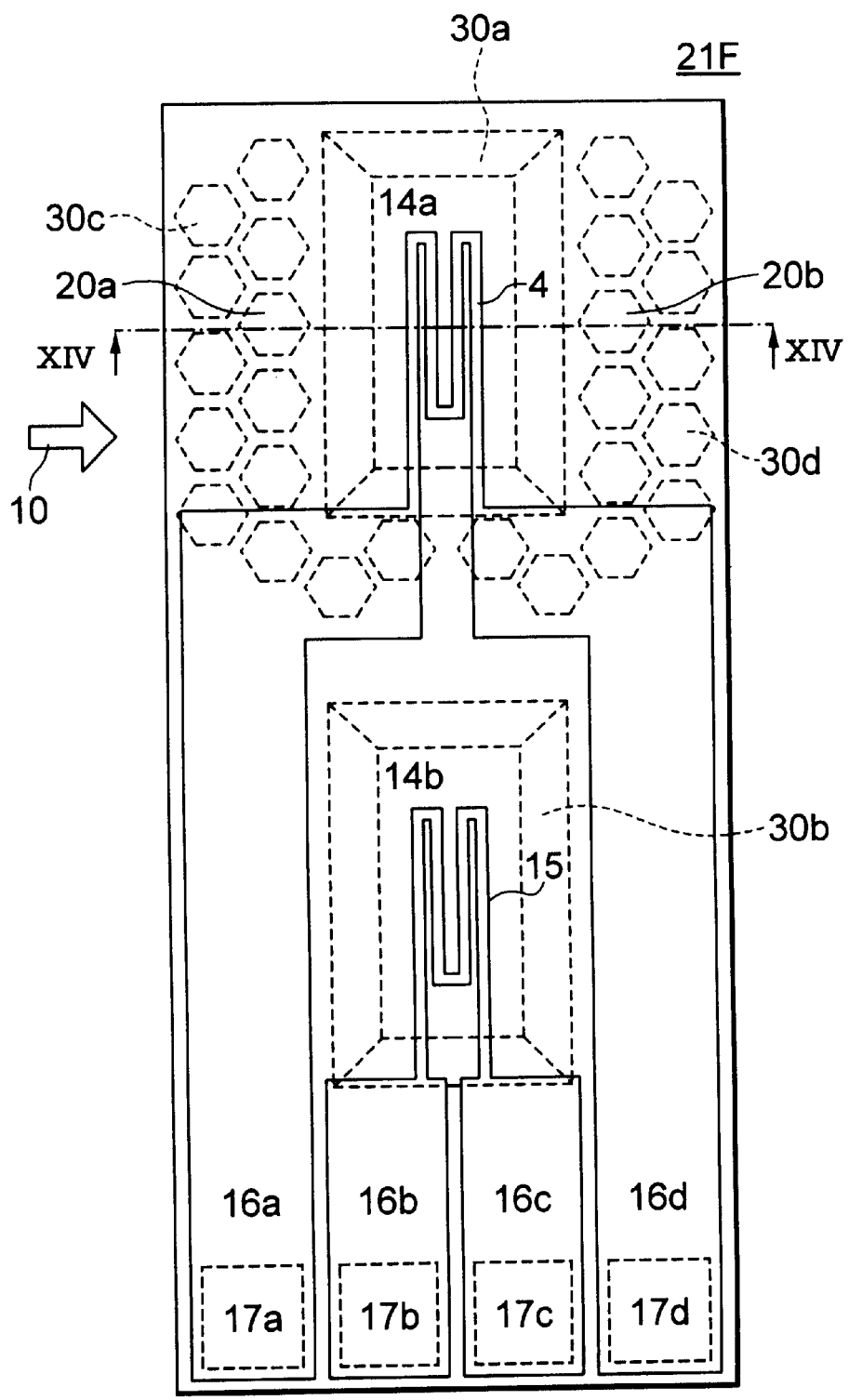
FIG. 13 is a plan view of a flow rate detecting device used in a flow rate sensor according to a seventh embodiment of the present invention.
Figure 14:
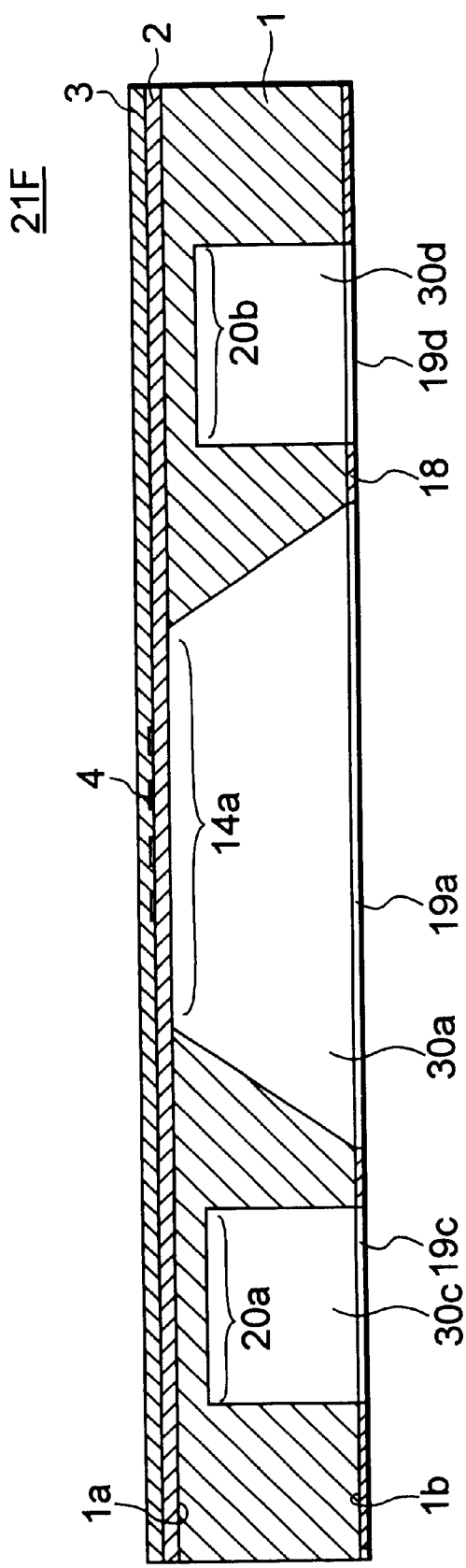
FIG. 14 is a sectional view taken in the direction of arrows on line XIV—XIV of FIG.13.

FIG. 13 is a plan view of a flow rate detecting device used in a flow rate sensor according to the seventh embodiment of the present invention. FIG. 14 is a sectional view taken in the direction of arrows on line XIV-XIV of FIG. 13.

In the device shown in FIGS. 13 and 14, a plate-like substrate 1 is constituted by an about 0.4 mm thick silicon substrate having a crystal orientation of (100). Further, a 1-μm-thick insulative supporting film 2 made of silicon nitride is formed on a top surface 1a of the plate-like substrate 1 by performing a method, such as sputtering, vapor deposition or CVD.

Moreover, a heating element 4 and a temperature compensating element 15, each of which is constituted by a thermo-sensitive resistance film, such as a platinum film, are formed on the supporting film 2 in such a way as to be apart from each other. The heating element 4 and the temperature compensating element 15 are configured in the following process in such a manner as to form a current path. First, a 0.2-μm-thick thermo-sensitive platinum film is formed on the surface of the supporting film 2 by using a vapor deposition or sputtering method. Then, patterning is performed on this thermo-sensitive resistance film by employing a photolithographic method and a wet (or dry) etching method. In this embodiment, the size of each of the heating element and the temperature compensating element is, for instance, 1 mm×0.3 mm.

Furthermore, an insulative protective coat 3 constituted by a 1-μm-thick film made of silicon nitride is formed on the heating element 4 and the temperature compensating element 15 by performing the sputtering, vapor deposition or CVD method. The heating element 4 and the temperature compensating element 15 are connected through lead patterns 16a to 16d to electrodes 17a to 17d for electrically connecting the flow rate detecting device 21 to an external circuit. These lead patterns 16a to 16d are simultaneously formed when the patterning is performed on the heating element 4 and the temperature compensating element 15. Further, the protective coats 3 formed on the electrodes 17a to 17d are removed so as to connect bonding wires to the electrodes 17a to 17d.

Further, cavities 30a, 30b, 30c and 30d are provided in a back surface 1b of the plate-like substrate 1 in such a way as to separate from one another. Thus, diaphragms 14a, 14b, 20a and 20b are formed. The heating element 4 is placed in the diaphragm 14a, while the temperature compensating element 15 is placed in the diaphragm 14b. Furthermore, the diaphragms 20a and 20b are provided at portions other than the areas in which the heating element 4 and the temperature element 15 are formed.

These diaphragms 14a, 14b, 20a and 20b are formed as follows. First, a back-surface protecting film 18 is formed on the back surface 1b of the plate-like substrate 1. Subsequently, etching holes 19a and 19b are formed by eliminating the back-surface protecting film 18 by, for instance, a photolithographic method. Thereafter, cavities 30a and 30b are formed by removing portions of the plate-like substrate 1, which have trapezoidal sections and are exposed from the etching holes 19a and 19b and extend from the back surface 1b to the supporting film 2, by, for example, alkali etching. Thus, the diaphragms 14a and 14b are formed. The etching holes 19ac and 19d are formed by removing the back-surface protecting film 18 by, for instance, a photolithographic method after the diaphragms 14a and 14b are formed. Thereafter, the cavities 30c and 30d are formed by performing a dry etching method, such as IBE (Ion Beam Etching), RIE (Reactive Ion Etching) or ICP (Inductively Coupled Plasma) method so that each of these cavities 30c and 30d has a hexagonal section parallel to the top surface 1a of the plate-like substrate 1 and also has a rectangular section perpendicular thereto. Thus, the diaphragms 20a and 20b are formed. Incidentally, the size of each of the diaphragms 14a and 14b is, for instance, 1.5 mm×0.9 mm. Further, the length of the sides of each of the hexagonal diaphragms 20a and 20b is, for instance, 0.1 mm. Additionally, the etching hole 19b (not shown in FIG. 13) is used for forming the diaphragm 14b. Incidentally, the other composing elements of the seventh embodiment are similar to the corresponding composing elements of the above-mentioned first embodiment.

In such a flow rate detecting device 2 IF, each of the cavities 30c and 30d obtained by etching the plate-like substrate 1 has a rectangular section perpendicular to the top surface 1a of the plate-like substrate 1. Thus, a larger part of the plate-like substrate 1 is eliminated from a predetermined area thereof, so that the heat resistance of the substrate 1 is increased. Consequently, the heat conduction loss of heat transmitted from the heating element 4 to the plate-like substrate 1 is reduced, so that the sensitivity of the flow rate sensor is enhanced.

Moreover, the heat capacity of the plate-like substrate 1 is reduced. Thus, a time taken to change heat flowing through the plate-like substrate 1 is decreased. Further, the time between a moment, at which the flow rate sensor is activated by supplying electric power thereto, and another moment, at which the sensor outputs an accurate flow rate signal, is shortened.

Furthermore, the diaphragms 20a and 20b are formed correspondingly to the many cavities 30c and 30d which have hexagonal sections parallel to the top surface 1a of the plate-like substrate 1 and which are placed in parallel to one another. Consequently, the heat insulation between the heating element 4 and the plate-like substrate 1 is enhanced without reducing the strength of the substrate 1.

Eighth Embodiment

Figure 15A:
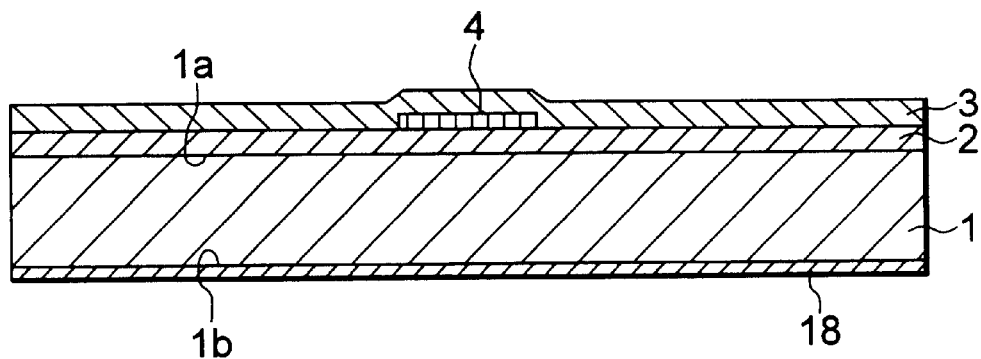
FIGS. 15A to 15C are sectional diagrams illustrating a process of manufacturing a flow rate detecting device used in a flow rate sensor according to an eighth embodiment of the present invention.
Figure 15B:
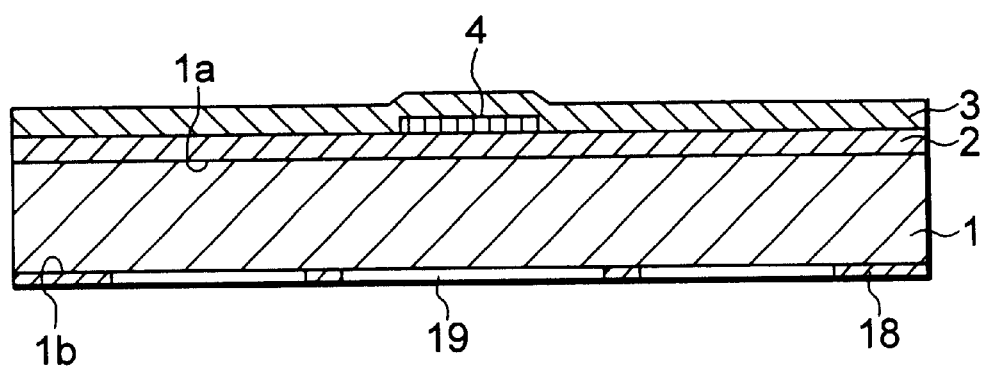
Figure 15C:
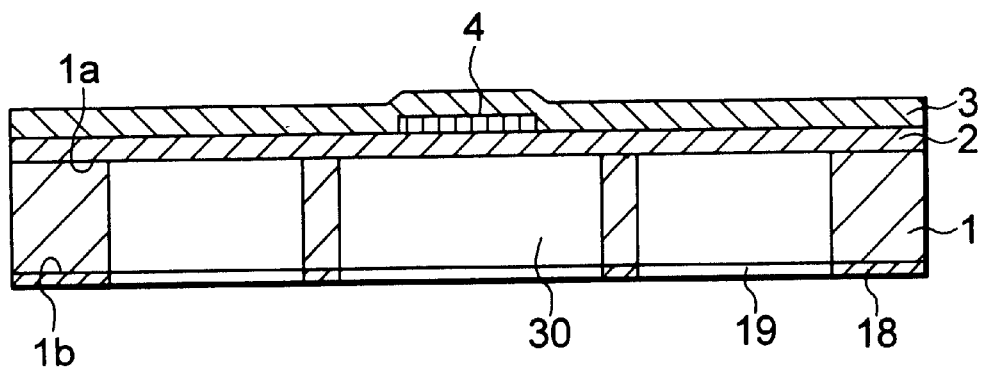
Figure 16:
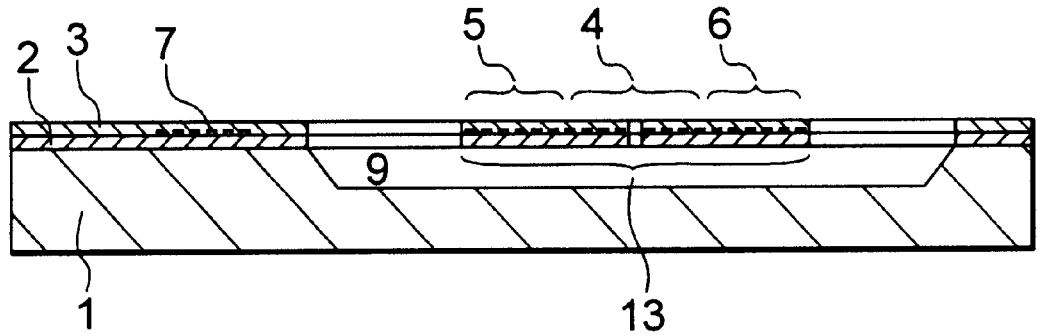
FIG. 16 is a sectional view of a conventional thermo-sensitive flow rate detecting device of the bridge type.
Figure 17:
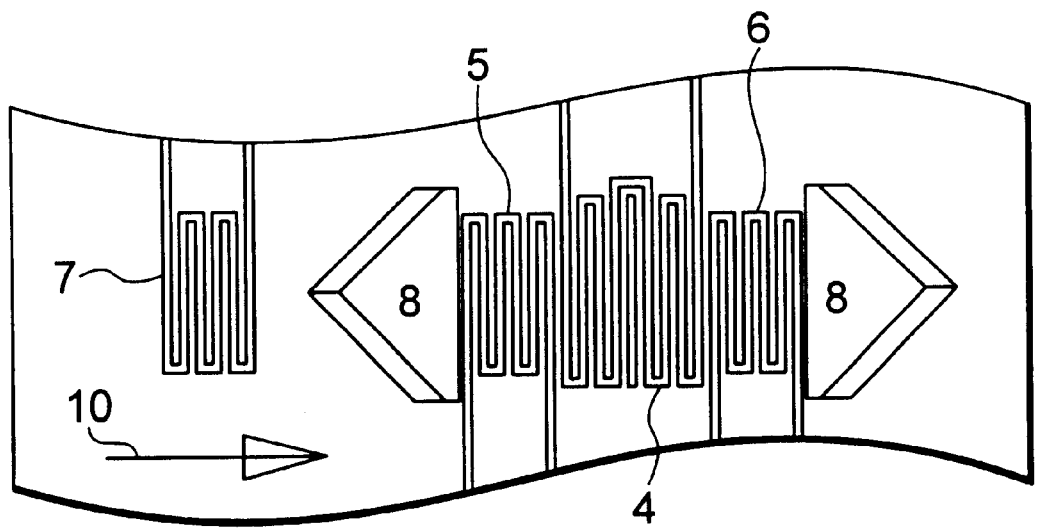
FIG. 17 is a plan view illustrating a state in which a protective film is removed from the conventional thermo-sensitive flow rate detecting device shown in FIG. 16.
Figure 18:
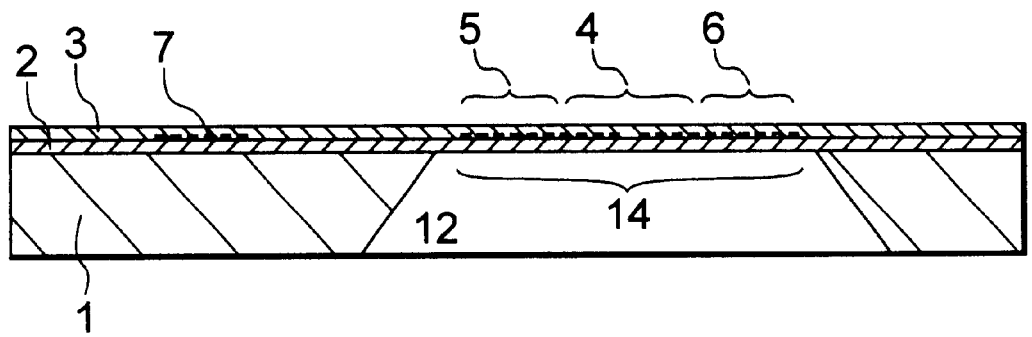
FIG. 18 is a sectional view of a conventional thermo-sensitive flow rate detecting device of the diaphragm type.
Figure 19:
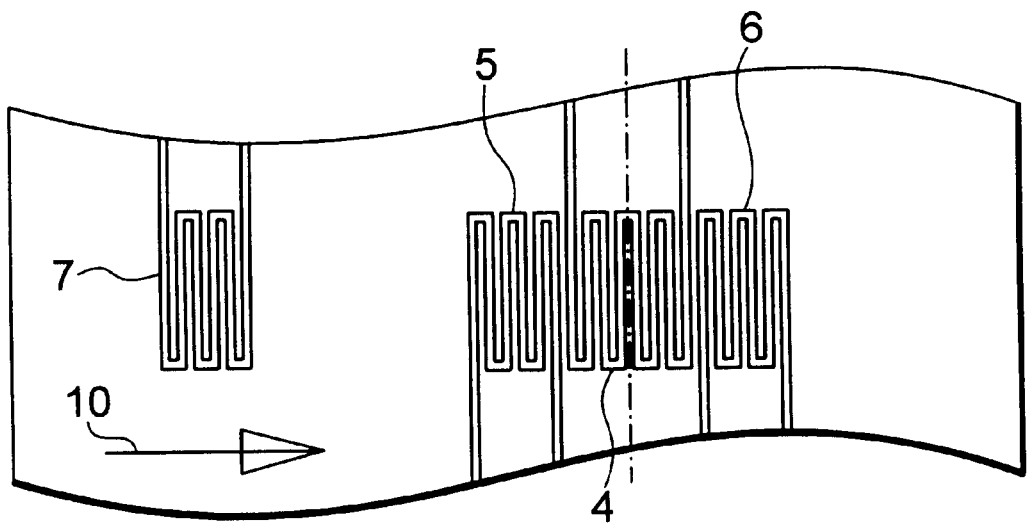
FIG. 19 is a plan view illustrating a state in which a protective film is removed from the conventional thermo-sensitive flow rate detecting device shown in FIG. 18.

FIGS. 15A to 15C are sectional diagrams illustrating a process of manufacturing a flow rate detecting device used in a flow rate sensor according to the eighth embodiment of the present invention. FIG. 15A is a diagram showing a state in which the back-surface protecting film is formed. FIG. 15B is a diagram showing a state in which the etching holes are formed in the device. FIG. 15C is a diagram showing a state in which the cavities are formed in the device.

First, a 1-μm-thick insulative supporting film 2 made of silicon nitride is formed on a top surface 1a of the plate-like substrate 1, which is constituted by an about 0.4 mm thick silicon substrate having a crystal orientation of (110), by performing a method, such as sputtering, vapor deposition or CVD. Subsequently, a heating element 4 and a temperature compensating element 15 are formed on the supporting film 2 by performing the following process in such a way as to be apart from each other. First, a 0.2-μm-thick platinum film is formed on the supporting film 2 by using a vapor deposition or sputtering method. Then, patterning is performed on this platinum film by employing a photolithographic method and a wet or dry etching method. Furthermore, an insulative protective coat 3 constituted by a 1-μm-thick film made of silicon nitride is formed on the supporting film 2 in such a way as to cover the heating element 4 and the temperature compensating element 15 by performing the sputtering, vapor deposition or CVD method. Further, a 1-μm-thick back-surface protecting film 18 is formed on the back surface 1b of the plate-like substrate 1 by performing a sputtering, vapor deposition or CVD method, as illustrated in FIG. 15A.

Subsequently, etching holes 19 are formed by partially eliminating the back-surface protecting film 18 by, for instance, a photolithographic method, as illustrated in FIG. 15B. Thereafter, cavities 30 are formed by removing portions of the plate-like substrate 1, which have trapezoidal sections and are exposed from the etching holes 19 and extend from the back surface 1b to the supporting film 2, by, for example, alkali anisotropic etching. Thus, the cavities 30 are formed, as illustrated in FIG. 15C, thereby forming diaphragms. Incidentally, etchants used in this method are KOH, TMAH (Tetra-Methyl-Ammonium Hydroxide) and NAOH.

The cavities 30 obtained by partly removing the plate-like substrate 1 by etching have rectangular sections, as illustrated in FIGS. 15A to 15C. Thus, an amount of decrease in the volume of the plate-like substrate 1, which is caused by etching, is increased. Further, the heat conduction loss of heat transmitted from the heating element 4 to the plate-like substrate 1 is reduced. Consequently, the sensitivity of the flow rate sensor is enhanced.

Furthermore, as compared with the dry etching method, the selection ratio of etching is very large in the case of the alkali anisotropic wet etching method. In the case of the alkali anisotropic wet etching method, the selection ratio for silicon is 100 to 1000 times that for silicon nitride. Thus, in the case of partly removing the substrate by the dry etching method, it is necessary for obtaining sufficient uniformity to overetch the substrate to a considerable extent. Therefore, there is a fear that the supporting film (or the diaphragm) 2 becomes too thin. Conversely, in the case of employing the alkali anisotropic wet etching method, the supporting film (or the diaphragm) 2 hardly dissolves even when the substrate is overetched in some degree.

Consequently, rectangular cavities are easily formed by performing the alkali anisotropic wet etching on the substrate 1 constituted by a silicon wafer having a crystal orientation of (110).

The sensor of the present invention is constituted as described above. Therefore, the present invention has advantageous effects that will be described hereunder.

According to the present invention, there is provided a thermo-sensitive flow rate sensor having a flow rate detecting device comprising: a plate-like substrate; a heating element and a temperature compensating element constituted by thermo-sensitive resistance films and formed on a top surface of the substrate in such a way as to be spaced apart from each other; and a low heat capacity portion formed by removing partially an area, in which the heating element is formed, of the substrate from a back surface side thereof. This thermo-sensitive flow rate sensor is used for measuring the flow velocity or flow rate of a measurement fluid according to a heat transfer phenomenon where a heat is transferred from the heating element or from a portion heated by the heating element to the measurement fluid. In this thermo-sensitive flow rate sensor, a diaphragm is constructed by forming at least one cavity by removing partially a region other than the area, in which the heating element and the temperature compensating element are formed, of the substrate from the back surface side thereof. Thus, the volume of the plate-like substrate is reduced. A ratio of an amount of heat, which is transmitted from the heating element to the plate-like substrate, to the amount of heat generated by the heating element is decreased. Thus, the heat insulating ability is enhanced. Consequently, a thermo-sensitive flow rate sensor having improved detecting sensitivity and responsivity is obtained.

Further, in an embodiment of the sensor of the present invention, the diaphragm is provided between the area, in which the heating element is formed, and the area in which the temperature compensating element is formed. Thus, the quantity of heat generated by the heating element and transmitted therefrom to the temperature compensating element through the plate-like substrate is reduced. Consequently, the measuring accuracy is enhanced.

Moreover, in an embodiment of the sensor of the present invention, the hole is provided in the diaphragm in such a way as to penetrate the diaphragm. This hole interrupts the heat transfer path between the heating element and the temperature compensating element. Consequently, the accurate temperature of a measurement fluid is measured by using the temperature compensating element.

Furthermore, in an embodiment of the sensor of the present invention, the temperature compensating element is placed at an end portion of the plate-like substrate. Thus, the heat resistance of the plate-like substrate is increased, while the heat capacity thereof is decreased.

Further, in an embodiment of the sensor of the present invention, at least one cavity has a rectangular section perpendicular to the top surface of the plate-like substrate. Thus, the volume of a portion to be removed from the plate-like substrate is increased. Consequently, the heat insulating ability is increased without reducing the strength of the substrate.

Moreover, in an embodiment of the sensor of the present invention, at least one cavity does not reach the top surface of the substrate from the back surface side thereof. Thus, the high strength of the plate-like substrate is achieved.

Furthermore, in an embodiment of the sensor of the present invention, at least one cavity comprises a plurality of the cavities provided in the plate-like substrate. Each of the cavities has a hexagonal section parallel to the top surface of the plate-like substrate. Thus, the volume of a portion to be removed from the plate-like substrate is increased. Consequently, the heat insulating ability of the substrate is improved without reducing the strength thereof.

According to the present invention, there is provided a method of manufacturing a thermo-sensitive flow rate sensor having a flow rate detecting device comprising: a plate-like substrate; a heating element and a temperature compensating element constituted by thermo-sensitive resistance films and formed on a top surface of the substrate in such a way as to be spaced apart from each other; and a low heat capacity portion formed by removing partially an area, in which the heating element is formed, of the substrate from a back surface side thereof This thermo-sensitive flow rate sensor is used for measuring the flow velocity or flow rate of a measurement fluid according to a heat transfer phenomenon where a heat is transferred from the heating element or from a portion heated by the heating element to the measurement fluid. This method has a step of constructing a diaphragm by forming at least one cavity by removing partially a region other than the area, in which the heating element and the temperature compensating element are formed, of the substrate from the back surface side thereof. In this step, a silicon substrate having a crystal orientation of (110) is provided with the plate-like substrate. An anisotropic wet etching is performed on the silicon substrate to form the at least one cavity. Thus, the volume of a portion to be removed from the plate-like substrate is increased. Consequently, there is provided a thermo-sensitive flow rate sensor manufacturing method, by which a flow rate detecting device having excellent heat insulating ability is obtained in a simple process without reducing the strength thereof.

Although the preferred embodiments of the present invention have been described above, it should be understood that the present invention is not limited thereto and that other modifications will be apparent to those skilled in the art without departing from the sprint of the invention. The scope of the present invention, therefore, should be determined solely by the appended claims.

What is claimed is:

1. A thermo-sensitive flow rate sensor having a flow rate detecting device comprising:
   a plate-like substrate having a top surface and a back surface side, said back surface side being opposite to said top surface;
   a support portion disposed on said top surface of said plate-like substrate;
   a heating element and a temperature compensating element constituted by thermo-sensitive resistance films respectively disposed on said support portion of said substrate in such a way as to be spaced apart from each other; and
   a low heat capacity portion formed in said back surface side of said substrate under an area where said heating element is disposed, said thermo-sensitive flow rate sensor being operative to measure a flow velocity or flow rate of a measurement fluid according to a heat transfer phenomenon where heat is transferred from said heating element or from a portion heated by said heating element to the measurement fluid,
   wherein a diaphragm is constructed by forming at least one cavity by removing partially a region, other than the area under which said heating element and said temperature compensating element are formed, of the substrate from the back surface side thereof, so as to reach said support portion, said diaphragm being electrically insulated from said heating element and said temperature compensating element.

2. The thermo-sensitive flow rate sensor according to claim 1, wherein said diaphragm is provided between the area, in which said heating element is formed, and the area in which said temperature compensating element is formed.

3. The thermo-sensitive flow rate sensor according to claim 2, wherein a hole is provided in said diaphragm in such a way as to penetrate therethrough.

4. The thermo-sensitive flow rate sensor according to claim 2, wherein said temperature compensating element is placed at an end portion of said plate-like substrate.

5. The thermo-sensitive flow rate sensor according to claim 1, wherein said at least one cavity has a rectangular section perpendicular to the top surface of said plate-like substrate.

6. The thermo-sensitive flow rate sensor according to claim 1, wherein a plurality of said diaphragm is provided in said plate-like substrate, each of said diaphragms having a hexagonal section parallel to the top surface of said plate-like substrate.

7. A thermo-sensitive flow rate sensor having a flow rate detecting device comprising:
   a plate-like substrate;
   a heating element and a temperature compensating element constituted by thermo-sensitive resistance films respectively formed on a top surface of said substrate in such a way as to be spaced apart from each other, said temperature compensating element being operative to regulate a temperature of said heating element; and
   a low heat capacity portion formed by removing partially an area, in which said heating element is formed, of said substrate from a back surface side thereof, said thermo-sensitive flow rate sensor being operative to measure a flow velocity or flow rate of a measurement fluid according to a heat transfer phenomenon where heat is transferred from said heating element or from a portion heated by said heating element to the measurement fluid,
   wherein a diaphragm is constructed by forming at least one cavity by removing partially a region, other than the area in which said heating element and said temperature compensating element are formed, of the substrate from the back surface side thereof, wherein said at least one cavity has a rectangular section parallel to the top surface of said plate-like substrate, said diaphragm being electrically insulated from said heating element and said temperature compensating element.

* * * * *